(12) United States Patent
Segev et al.

(10) Patent No.: US 11,720,715 B2
(45) Date of Patent: Aug. 8, 2023

(54) SECURE DATA STORAGE DEVICE AND METHOD OF ENCRYPTION

(71) Applicant: Western Digital Technologies, Inc., San Jose, CA (US)

(72) Inventors: Amir Segev, Meitar (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/207,725

(22) Filed: Mar. 21, 2021

(65) Prior Publication Data

US 2022/0300663 A1   Sep. 22, 2022

(51) Int. Cl.
*G06F 21/78* (2013.01)
*G06F 21/85* (2013.01)
*G06F 21/74* (2013.01)
*G06F 21/60* (2013.01)

(52) U.S. Cl.
CPC ............ *G06F 21/78* (2013.01); *G06F 21/602* (2013.01); *G06F 21/74* (2013.01); *G06F 21/85* (2013.01)

(58) Field of Classification Search
CPC ........ G06F 21/78; G06F 21/602; G06F 21/74; G06F 21/85
See application file for complete search history.

(56) References Cited

U.S. PATENT DOCUMENTS

| | | | |
|---|---|---|---|
| 10,509,575 B2 | 12/2019 | Woo et al. | |
| 11,263,153 B1* | 3/2022 | Cheng | G06F 21/79 |
| 2014/0040639 A1* | 2/2014 | Raam | G06F 21/78 713/193 |
| 2015/0067349 A1* | 3/2015 | Werner | H04L 9/0877 713/189 |
| 2015/0074329 A1* | 3/2015 | Kondo | G06F 12/1408 711/163 |
| 2019/0362081 A1* | 11/2019 | Kanno | G06F 21/602 |
| 2020/0133566 A1 | 4/2020 | Kim et al. | |
| 2020/0201711 A1* | 6/2020 | Kim | G06F 11/1048 |
| 2020/0402426 A1* | 12/2020 | Li | G06F 12/1408 |
| 2021/0073404 A1* | 3/2021 | Sakata | G06F 21/85 |

* cited by examiner

*Primary Examiner* — Theodore C Parsons
*Assistant Examiner* — Alan L Kong
(74) *Attorney, Agent, or Firm* — Patent Law Works, LLP

(57) ABSTRACT

A data storage device and method for securely storing and retrieving data at a data storage device. The disclosure includes a reverse encryption where a decryption function is applied to plaintext data to generate ciphertext data. Conversely, the disclosure includes applying an encryption function to ciphertext data to generate plaintext data. This involves using an encryption function that is inverse, and symmetric, to the decryption function. In some specific examples, this includes sharing cryptography engines for securing user data in a storage medium and securing device management data in host memory.

20 Claims, 11 Drawing Sheets

SECURE DATA STORAGE DEVICE AND METHOD OF ENCRYPTION

TECHNICAL FIELD

The present disclosure relates to a secure data storage device and method of encryption of data. This includes cryptography engines to encrypt and decrypt data.

BACKGROUND

Encryption of user data enables secure storage on data storage devices. This can include using a security algorithm for encryption of the user data for storage and decryption of user data sent to the host device. The data storage devices may be connected externally to a host device or at the host device such as a solid state drive (SSD) at a computer.

In some examples, the data storage devices includes an SSD using NAND flash memory. SSDs can have firmware that, when operating, require large amounts of data to be stored just for device management. For example, address translation tables, error correction codes, etc. To save space on the data storage device, such device management data can be stored in a host memory buffer of the host device. That is, giving part of the host memory buffer for use by a controller of the SSD. For security, the device management data stored in the host memory buffer can also be encrypted.

SUMMARY

Aspects of the present disclosure seeks to facilitate secure storage of user data at a storage medium of the data storage device and secure storage of device management data at the host memory. This includes enabling specified reading and writing of both user data and device management data simultaneously. A further consideration is utilizing a smaller number of cryptography engines to achieve the read and write functions. Other aspects of the present disclosure seeks to disclose alternative methods of secure storage of user data at a storage medium.

Disclosed herein is a data storage device comprising: a first cryptography engine, a second cryptography engine, a processor to control the data storage device, and storage medium. The first cryptography engine is configured to apply a first cryptographic function to data; and the second cryptography engine to apply a second cryptographic function to data, wherein the first cryptographic function is inverse, and symmetric, to the second cryptographic function. The data storage device also comprises multiple paths. A first path to pass user data from the storage medium to a host device, wherein the first path passes through the second cryptography engine to apply the second cryptographic function to the user data sent to the host device. A second path to pass user data from the host device to the storage medium, wherein the second path passes through the first cryptography engine to apply the first cryptographic function to the user data sent to the storage medium. A third path to pass device management data from the processor to the host memory of the host device, wherein the third path passes through the second cryptography engine to apply the second cryptographic function to the device management data sent to the host memory. A fourth path to pass device management data from the host memory to the processor, wherein the fourth path passes through the first cryptography engine to apply the first cryptographic function to the device management data received at the processor.

In some embodiments, the data storage device further comprises a bus to enable communication between the host device and the data storage device, wherein the bus comprises: a write channel to write data from the data storage device to the host device, wherein the write channel is selectively operable to form part of the first path or the third path; and a read channel to read data from the host device to the data storage device, wherein the read channel is selectively operable to form part of the second path or the fourth path; and wherein the write channel and read channel are configurable to operate simultaneously.

In some embodiments the data storage device is selectively configurable by the processor to operate in a first mode to simultaneously pass user data in the first path and pass device management data in the fourth path. In some embodiments the data storage device is selectively configurable by the processor to operate in a second mode to simultaneously pass device management data in the third path and pass user data in the second path.

In some embodiments the data storage device is selectively configurable by the processor to operate in a third mode to simultaneously pass user data in the first path and user data in the second path. In some embodiments the data storage device is selectively configurable by the processor to operate in a fourth mode to simultaneously pass device management data in the third path and device management data in the fourth path.

In some embodiments of the data storage device, the first cryptographic function is a decryption function and the second cryptographic function is an encryption function.

In some alternative embodiments of the data storage device, the first cryptographic function is an encryption function and the second cryptographic function is a decryption function.

In some embodiments of the data storage device according, the first cryptography engine and second cryptography engine are XIS engines.

In some embodiments of the data storage device, the storage medium is solid-state storage.

In some embodiments of the data storage device, the bus is a PCIe (Peripheral Component Interconnect Express) standard bus.

There is also disclosed a method for encrypting and decrypting data for a data storage device having a storage medium, a first cryptography engine, a second cryptography engine, and a processor to control the data storage device. In a first mode the method comprises: writing user data from the storage medium to the host device on a first path, wherein writing on the first path includes applying a second cryptographic function to the user data by the second cryptography engine; and reading device management data from a host memory of the host device to the processor on a fourth path, wherein reading on the fourth path includes applying a first cryptographic function to the device management data by the first cryptography engine, wherein the first cryptographic function is inverse, and symmetric, to the second cryptographic function.

In some embodiments, a second mode of the method comprises: writing device management data from the processor to the host memory on a third path, wherein writing on the third path includes applying a second cryptographic function to the device management data by the second cryptography engine; and reading user data from the host device to the storage medium on a second path, wherein reading on the second path includes applying a first cryptographic function to the user data by the first cryptography engine.

In some embodiments of the method, wherein in the first mode, the first path and fourth path are configured as separate paths to enable simultaneous writing of user data and reading of device management data are performed simultaneously, and wherein in the second mode the second path and third path are configured as separate paths to enable simultaneous writing of device management data and reading of user data.

In some embodiments of the method, selective writing user data in the first mode and selective writing device management data in the second mode includes communicating to the host device via a write channel of a bus between the host device and the data storage device. Selective reading of device management data in the first mode and selective reading of user data in the second mode includes communicating to the host device via a read channel of the bus.

In some embodiments of the method, wherein in a third mode, the method comprises: writing user data from the storage medium to the host device on a first path and reading user data from the host device to the storage medium on a second path. Writing on the first path includes applying a second cryptographic function to the user data by the second cryptography engine. Reading on the second path includes applying a first cryptographic function to the user data by the first cryptography engine.

In some embodiments of the method, wherein in a fourth mode, the method comprises: writing device management data from the processor to the host memory on a third path and reading device management data from a host memory of the host device to the processor on a fourth path. Writing on the third path includes applying a second cryptographic function to the device management data by the second cryptography engine. Reading on the fourth path includes applying a first cryptographic function to the device management data by the first cryptography engine.

In some embodiments of the method, the first cryptographic function is a decryption function and the second cryptographic function is an encryption function.

In some embodiments of the method, the first cryptographic function is an encryption function and the second cryptographic function is a decryption function.

There is also disclosed a data storage device comprising: means for receiving plaintext user data from a host device; means for generating ciphertext user data by applying a decryption function to the plaintext user data with a first cryptography engine; means for storing the ciphertext user data at a storage medium of the data storage device; means for retrieving the ciphertext user data from the storage medium; means for generating plaintext user data by applying an encryption function to the ciphertext user data with a second cryptography engine; and means for sending the plaintext user data to the host device, wherein the decryption function is inverse, and symmetric, to the encryption function.

In some embodiments of the data storage device, the first cryptography engine and second cryptography engine are means for applying XTS cryptography functions.

BRIEF DESCRIPTION OF DRAWINGS

Examples of the present disclosure will now be described with reference to the following drawings.

DESCRIPTION OF EMBODIMENTS

Overview

Figure 1:
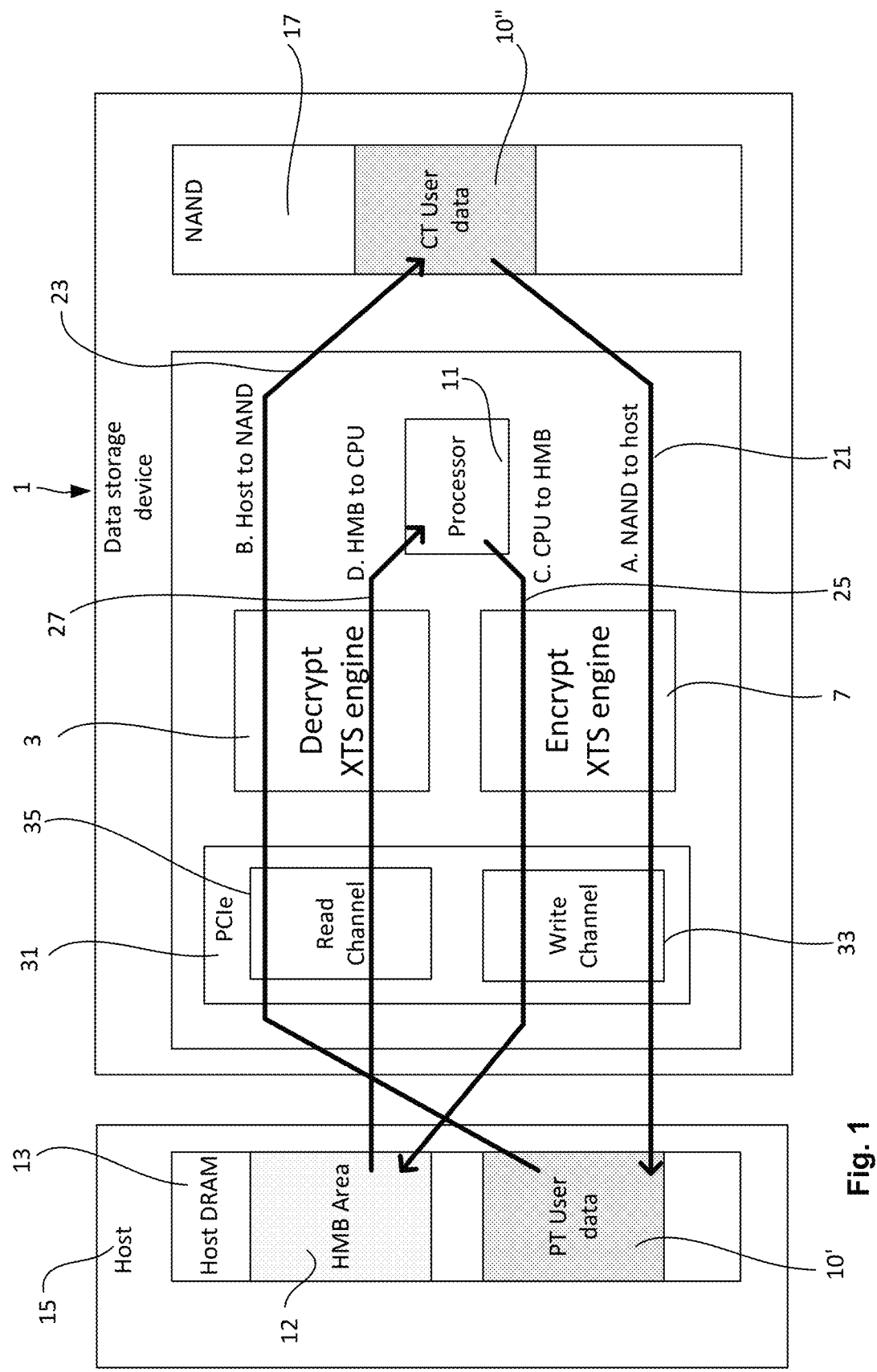
FIG. 1 is a schematic diagram of a data storage device according to a first example connected to a host device.

FIG. 1 illustrates an example of a data storage device 1 with a host device 15. The host device 15 includes a host memory 13 that can include dynamic random access memory (DRAM). The host memory 13 can be used to temporarily store user data for use by the host device. The host memory 13 can also be used as a host memory buffer (HMB) to store device management data 12 for a processor 11 of the data storage device 1. The device management data 12 can include data used for management of the data storage device 1, such as translation tables, error correction codes, etc. For brevity, other components of the host device 15 are not illustrated, which can include one or more of a central processing unit, user interface(s), communication modules, and other peripherals used with a computer or computing device.

The data storage device 1 includes a storage medium 17 to store user data, and a processor 11 to control and manage the data storage device 1, and a bus 31 to enable communication between the data storage device 1 and the host device 15. The data storage device also includes a first cryptography engine 3 to apply a first cryptographic function 5 to data, and a second cryptography engine 7 to apply a second cryptographic function 9 to data.

The first cryptographic function 5 is inverse, and symmetric to the second cryptographic function 9. This enables either cryptographic functions to be used for encryption with the other complementary inverse function for decryption. That is, a first plaintext can be encrypted to a first ciphertext using the first cryptographic function 5. That encrypted first ciphertext can be decrypted back to the first plaintext with the second cryptographic function 9. Alternatively, a second plaintext can be encrypted to a second ciphertext using the second cryptographic function 9. That second ciphertext can be decrypted back to the second plaintext by applying the first cryptographic function 5.

The first and second cryptographic functions 5, 9 may use a symmetric-key algorithm. In some examples, this includes using XTS encryption.

One advantage is that both the first cryptography engine 3 and the second cryptography engine can be used to functionally secure data into ciphertext for storage as well as conversion back to plaintext. This includes using a reverse encryption method to secure data as will be described below.

Figure 8:
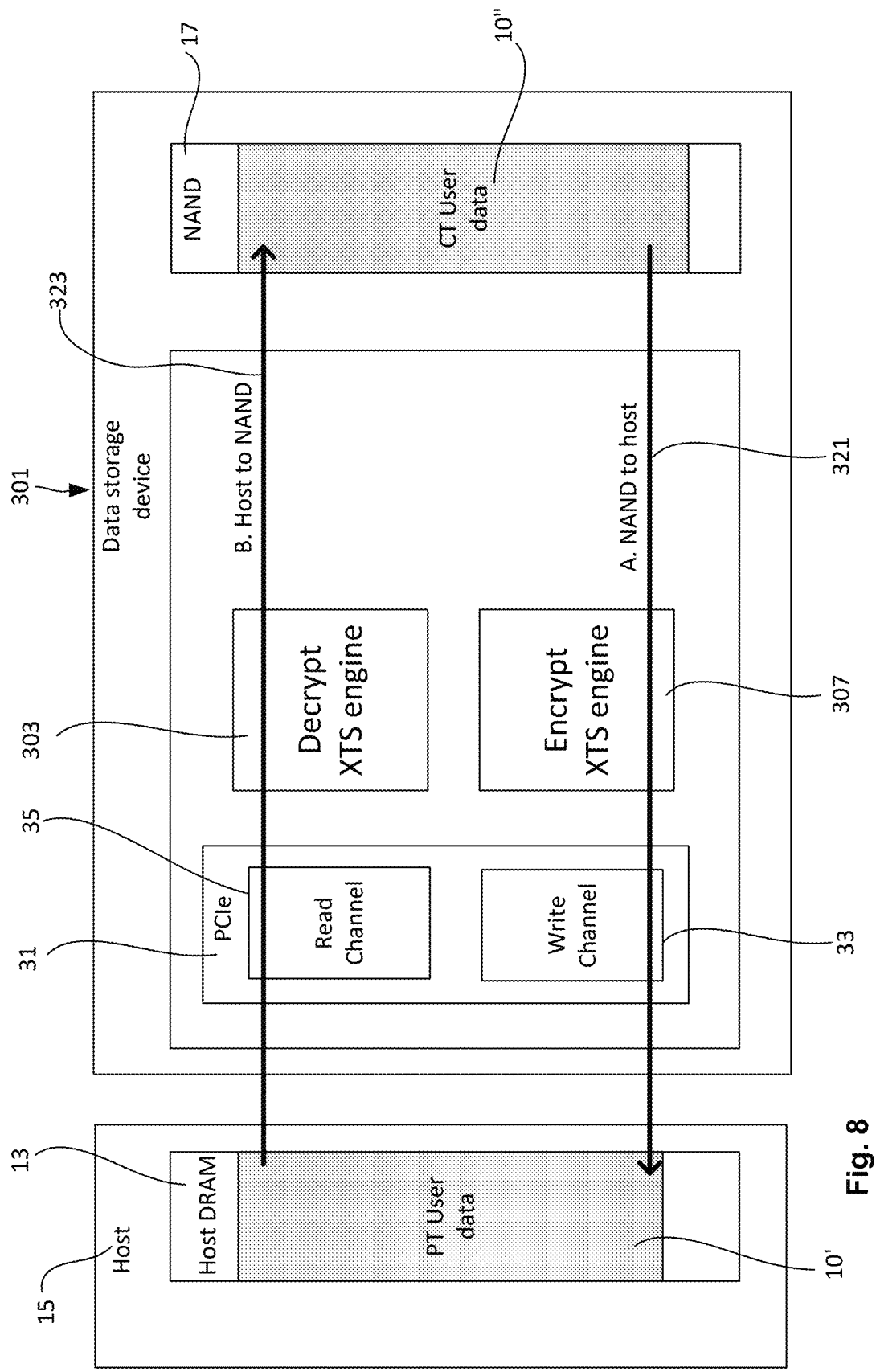
FIG. 8 is a schematic diagram of a data storage device with reverse encryption connected to a host device according to a third example.

In some examples (as illustrated in FIGS. 1 and 8) the first cryptography engine 3, 303 is a decryption engine to apply a decryption function 5. The second cryptography engine 7, 307 is an encryption engine to apply an encryption function 9. Since the cryptographic functions 5, 9 are inverse and symmetric, it is possible to apply a decryption function 5 to plaintext user data 10' received from the host device 15 to obtain ciphertext user data 10", Such ciphertext user data can then be securely stored on the storage medium 17. When the plaintext user data 10' is required by the host device 15, the ciphertext user data 10" from the storage medium 17 is sent to the second cryptography engine 5 to apply an encryption function 9 to produce the plaintext user data 10' for the host device 15.

Another advantage is to enable particular parallel operations for both:

(i) device management data 12 between the host memory 13 and the processor 11; and (ii) user data 10 between the host device 15 and the data storage device 17.

This is achieved by sharing the first and second cryptography engines 3, 7 for encryption and decryption of device management data 12 and user data 10. Referring to FIG. 1, four paths through the two cryptography engines 3, 7 are illustrated.

A first path 21 is configured to pass user data 10 from the storage medium 17 to the host device 15. The user data 10 at the storage medium 17 can include ciphertext user data. 10" that had been previously encrypted with the first cryptographic function 5 such that the ciphertext user data 10" is securely stored on the storage medium 17. The first path 21 passes through the second cryptography engine to apply the second cryptographic function 9 to the ciphertext user data 10" to provide plaintext user data 10' to be received at the host device 15. The plaintext user data 10' may be received at the host memory 13 for use in one or more other processes at the host device 15.

A second path 23 is configured to pass user data 10 from the host device 15 to the storage medium 17. In some examples, the user data 10 is initially plaintext user data 10' at the host memory 13 of the host device. The second path 23 passes the plaintext user data 10' through the first cryptography engine 3 to apply the first cryptographic function 5. The resultant ciphertext user data can then be received and securely stored at storage medium 17.

A third path 25 is configured to pass device management data 12 from the processor 11 to the host memory 13 of the host device 15. The third path 25 passes through the second cryptography engine 7 to apply the second cryptographic function 9 to the device management data 12. Typically this can include plaintext device management data 12 from the processor whereby the second cryptographic function 9 produces ciphertext device management data 12 to be receive and securely stored at the host memory 13.

A fourth path 27 is configured to pass device management data 12 from the host memory 13 to the processor 11, wherein the fourth path 27 passes through the first cryptography engine 3 to apply the first cryptographic function 5 to the device management data 12. The device management data 12 securely stored at the host memory 13 may include ciphertext device management data 12, and applying the first cryptographic function 5 produces plaintext device management data 12 to be received at the processor 11.

Figure 2:
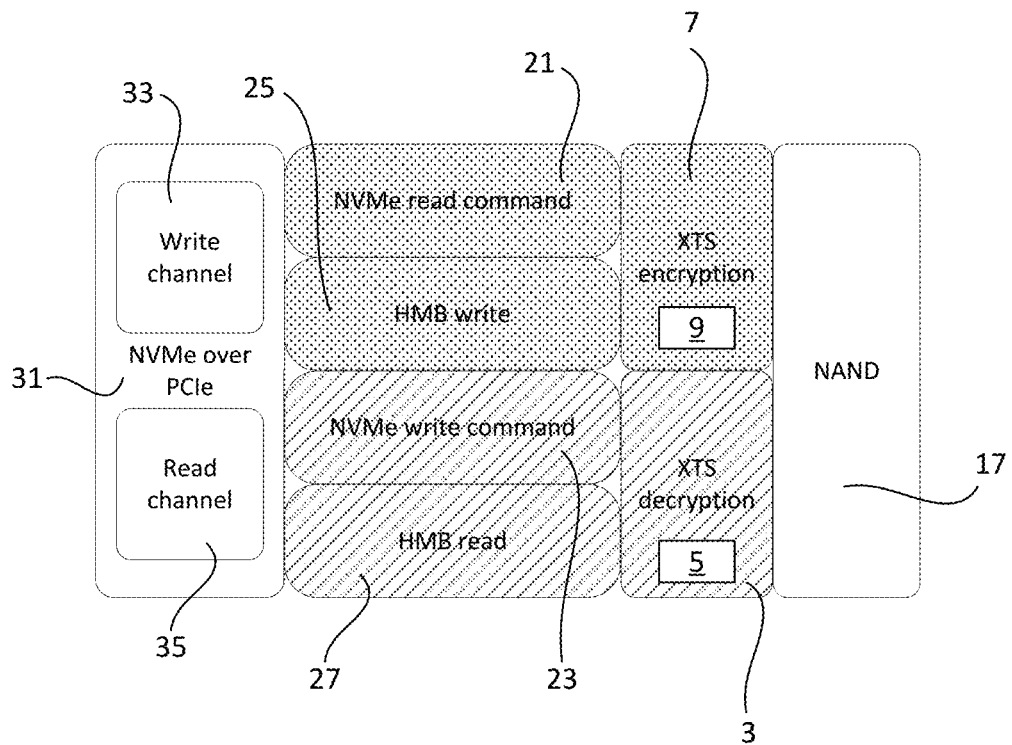
FIG. 2 is a schematic representation of a concept of utilizing two encryption engines for four read and write paths for the data storage device of FIG. 1

The processor 11, or other controller, can selectively configure any one of the first, second, third, or fourth paths 21, 23, 25, 27 to operate to encrypt or decrypt respective device management data 12 or user data 10. Furthermore, the processor 11, or other controller, can selectively configure two parallel paths to operate at the same time to simultaneously utilize the first and second cryptography engines 3, 7. This can include the following parallel paths: (i) the first path 21 and fourth path 27; (ii) the second path 23 and third path 25; (iii) the first path 21 and second path 23; and (iv) the third path 25 and fourth path 27. These parallel paths are conceptually represented in FIG. 2 that shows a full duplex bus where certain read and write transfers can be done in parallel. Furthermore, each of the combinations of (i). (ii). (iii), and (iv) utilize a single read and single write operation through the bus 33. In this example, there are two paths that cannot operate in parallel due to collisions. In particular: (a) the first path 21 and third path 25 (as they would both require the same resources of a write channel 33 on the bus 31 and the same second cryptography engine 7); and (h) the second path 23 and fourth path 27 (as they would both require the same resources of a read channel 35 on the bus 31 and the same first cryptography engine 3).

Figure 10:
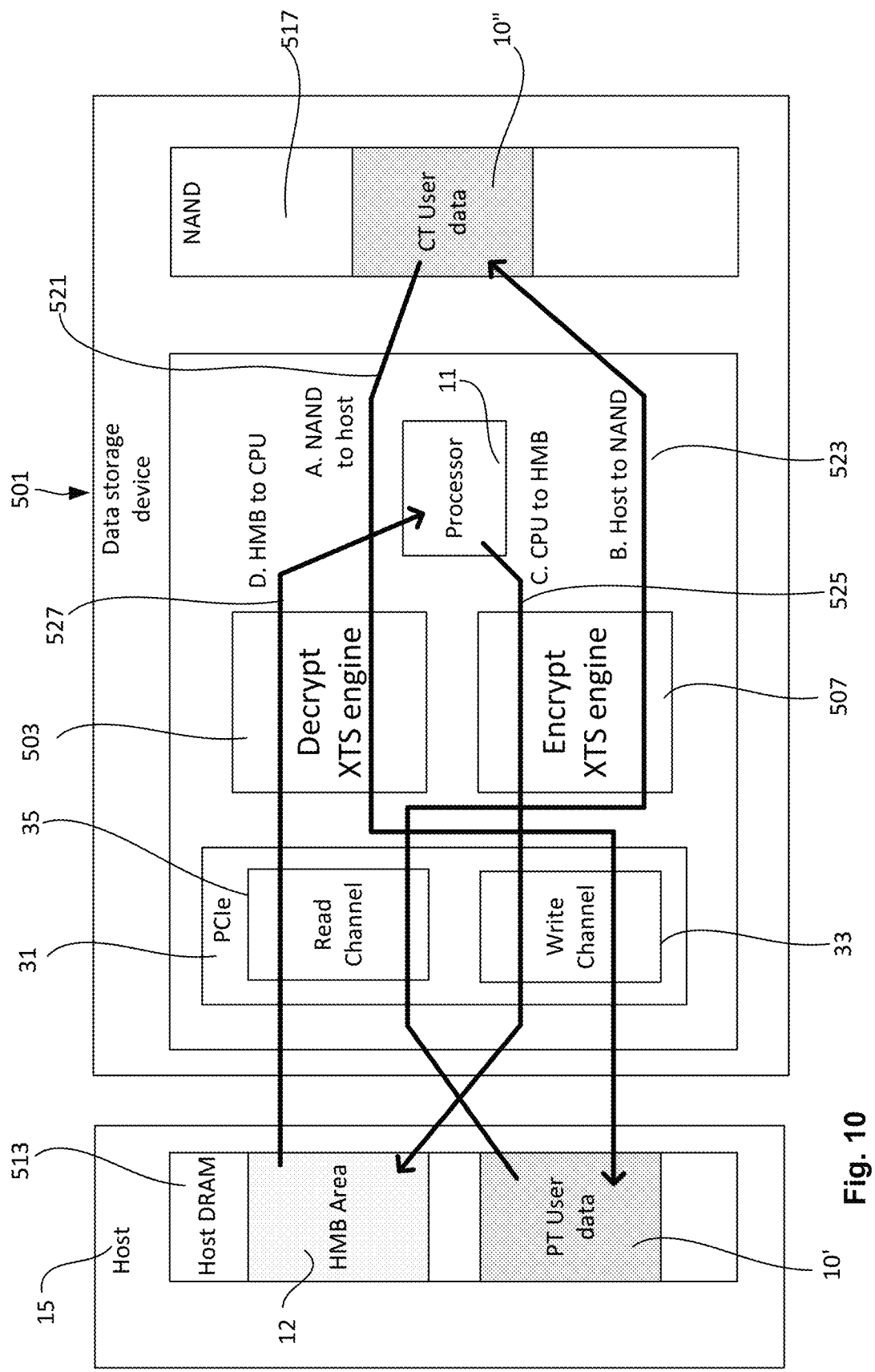
FIG. 10 is an alternative approach to securely storing user data and device management data with two cryptography engines.
Figure 11:
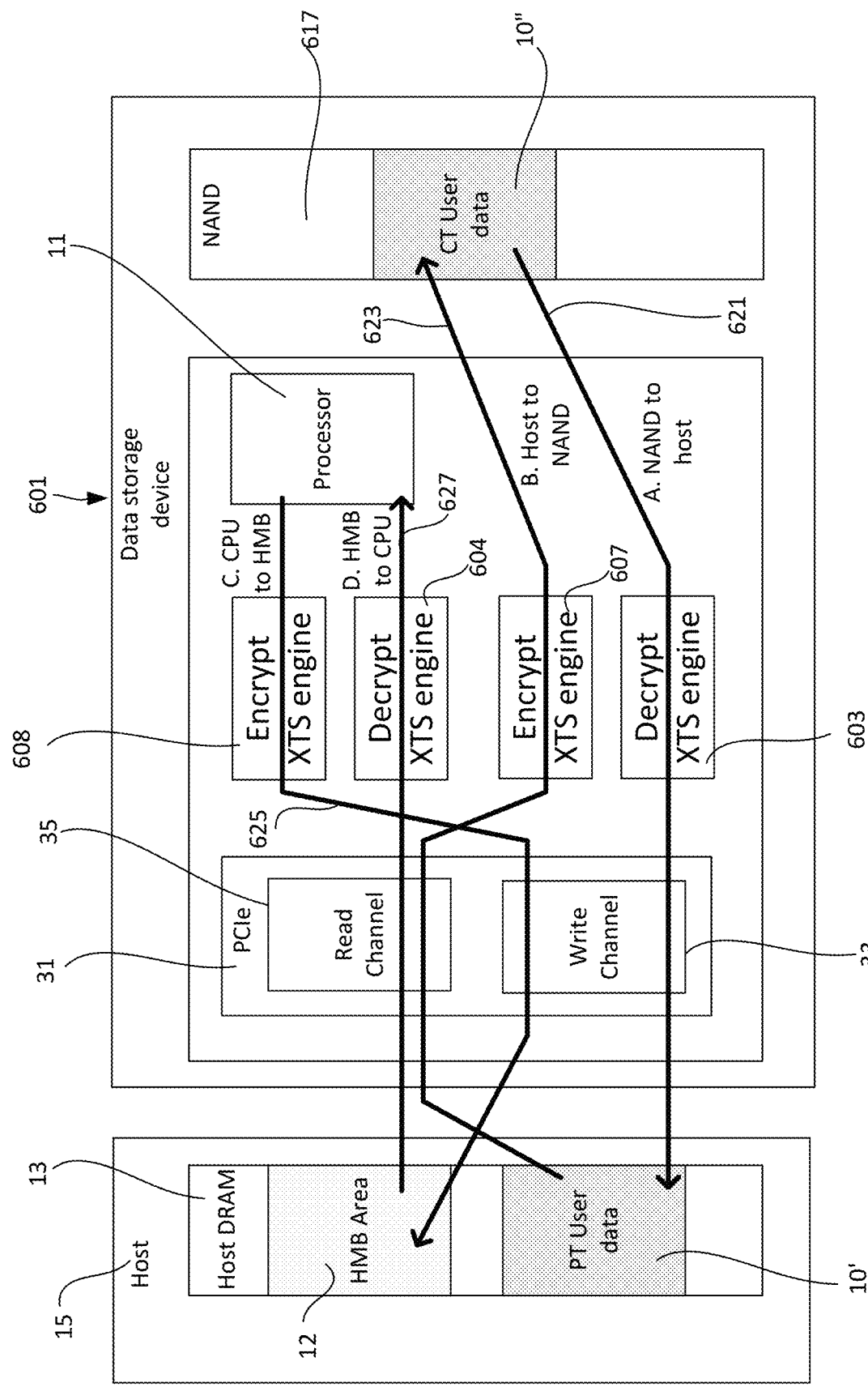
FIG. 11 is an alternative approach to securely storing user data and device management data with four cryptography engines.

Notably the combination of the first path 21 parallel with the fourth path 27 (in a first mode 101 described in further detail below), or combination of the second path 23 parallel with the third path 25 (in a second mode 102 described in further detail below), involve simultaneous operations that involve user data 10 and device management data 12 at the same time while using only two cryptography engines 3, 7. This can be distinguished from other configurations that use two cryptography engines (as illustrated in FIG. 10) that can only allow reading or writing of user data simultaneously, or alternatively reading or writing of device management data simultaneously. This can also be distinguished from other configurations that require four cryptography engines (as illustrated in FIG. 11) to enable mixed operation that simultaneously involve user data and device management data. Such later configurations have the added cost of requiring double the number of cryptography engines.

First Example of a Data Storage Device 1

A first example of the data storage device 1 is illustrated in FIG. 1. The bus 31 of the data storage device 1 includes a PCIe (Peripheral Component Interconnect Express) standard bus that has a read channel 35 (to receive data from the host device 15) and a write channel 33 (to write data to the host device). In some examples, the communication specification of the data storage device 1 to host device 15 includes NVMe also known as NVMCIS—Non-volatile memory host controller interface specification). The read channel 35 and write channel 33 can operate simultaneously in parallel to enable full duplex communication between the data storage device 1 and the host device 15.

The read channel 35 is selectively operable to form part of either the second path 23 or the fourth path 27. That is, to receive user data 10 from the host device 15 and pass the user data 10 to the first cryptography engine 3. Or alternatively, to receive device management data 12 from the host memory 13 of the host device 15 and pass that device management data 12 to the first cryptography engine 3. The read channel 35 and selective operation of either the second path 23 or fourth path 27 is controlled by the processor 11 to prevent collision when reading data through the read channel 35. This is important as the second path 23 and fourth path 27 utilize the same cryptography engine 3.

The write channel 33 is selectively operable to form part of either the first path 21 or the third path 25. That is, to either write user data 10 to the host device 15 or write device management data 12 to the host memory 13 of the host device 15. The write channel 33 and selective operation of either the first path 21 or third path 25 is controlled by the processor 11 to prevent collision when writing through the write channel 35. The write channel 33 may be configured to write data from the second cryptography engine 7 that is a shared resource for the first path 21 and third path 25.

The storage medium 17 of the data storage device stores user data. Typically, this includes user data that is in the form of ciphertext user data 10". In some examples of the data storage device, the storage medium 17 is part of a solid state drive (SSD). This can include NAND flash memory or NOR flash memory. In other examples of the data storage device, the storage medium 17 can include magnetic storage such as in a hard disk drive HDD or a tape drive. In yet further examples, the storage medium 17 can be a combination of flash memory and magnetic storage such as in a hybrid drive.

The first and second cryptography engines 3, 7 include corresponding first and second cryptographic functions 5, 9 that are inverse and symmetric. In the example illustrated in FIG. 1, the first cryptography engine 3 performs a first cryptographic function 5 that is a decryption function. The second cryptography engine 5 performs a second cryptographic function 9 that is an encryption function.

The cryptographic functions can be selected from cryptography algorithms that have inverse cryptographic properties and using symmetric-key algorithms. That is:

Plaintext=Encryption (Decryption (Plaintext))

In one example, this includes utilizing XTS encryption (XEX-based tweaked codebook mode with ciphertext stealing). Where XEX is short for XOR-encrypt-XOR and XOR is short for exclusive OR. Thus in one example the first cryptography engine 3 is an XTS decryption engine and the second cryptography engine 7 is an XTS encryption engine.

The processor 11 controls operation of the data storage device 1, including controlling data traffic between the host device 15 and the storage medium 17. In some examples, the processor 11 is configured to enable direct memory access (DMA) between the host memory 13 and data storage device 1. That is, the data storage device can read and write to the host memory 13 independent of the central processing unit of the host device 15. Thus the processor 11 also controls the read and write channels 33, 35 through the PCIe bus.

Method for Encrypting and Decrypting Data

The processor 11 selectively configures the data storage device 1 to operate with the first, second, third, and fourth paths 21, 23, 25, 27. The processor 11 may operate the paths singularly in a half-duplex mode. In addition, the data storage device 1 can be configured for with parallel paths to enable full-duplex communication between the data storage device 1 and the host device 15.

Examples of methods 100 to communicate in the parallel paths will now be described in the following four operating modes controlled by the processor 11. This can include a method 100, when executed by the processor 11, causes the data storage device 1 to perform the steps of the method.

First Mode 101—Writing User Data and Reading Device Management Data

Figure 3:
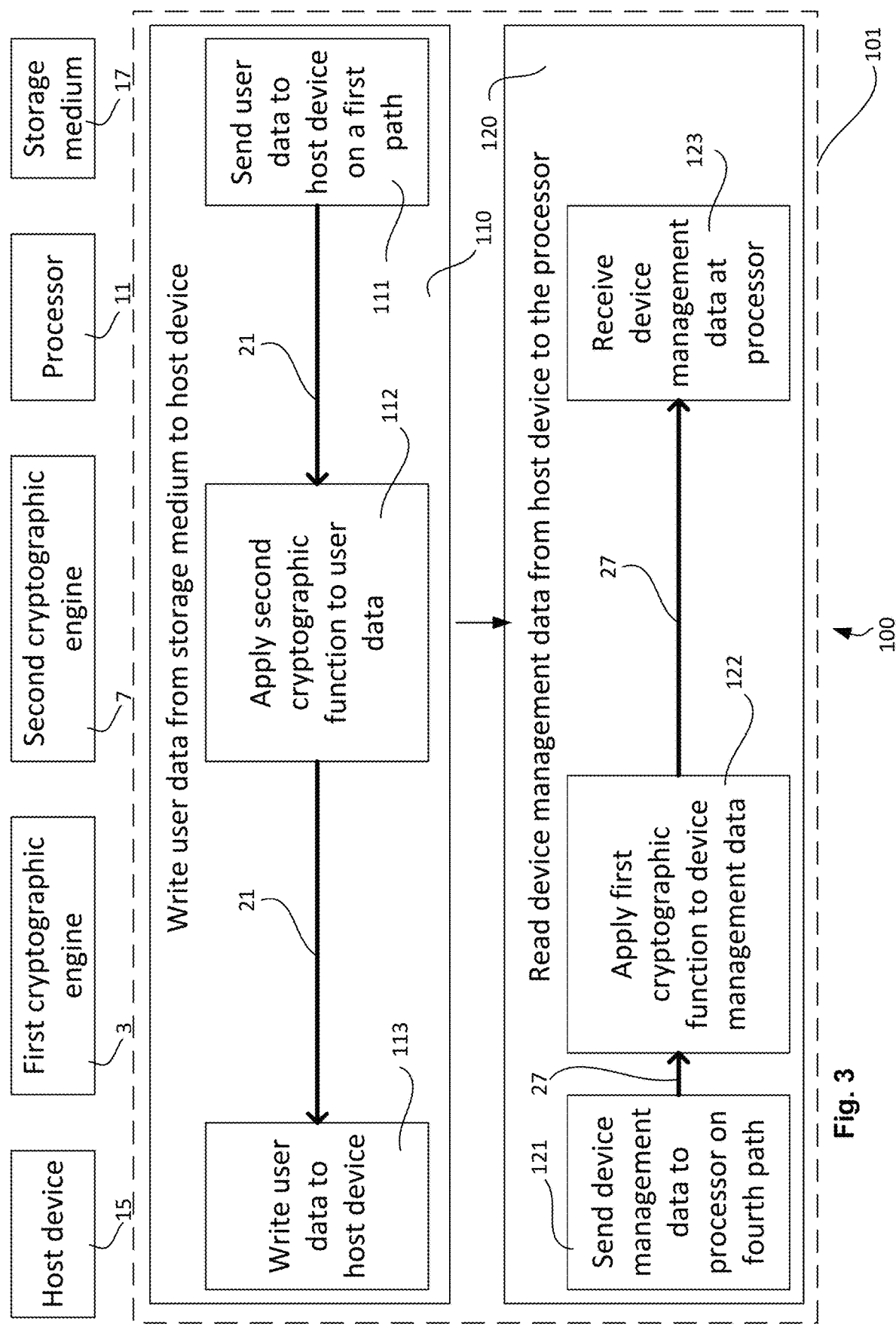
FIG. 3 is an example method of encrypting and decrypting data for the data storage device of FIG. 1 in a first mode to simultaneously write user data to the host device and read device management data from the host memory of the host device.

An example of the first mode 101 is illustrated in FIG. 3. In the first mode 101, the data storage device 1 is configured to simultaneously operate the first path 21 (using the second cryptography engine 7) and the fourth path 27 (using the first cryptography engine 3). That is, simultaneously writing 110 user data 10 from the data storage device 1 to the host device 15 and reading 120 device management data 12 from the host memory 13 to the processor 11.

Writing 110 user data 10 to the host device 15 includes sending 111 user data to the host device 15 on a first path 21. In this example, the user data 10 is ciphertext user data 10" that is securely stored on the storage medium 17, where the ciphertext user data was previously generated by applying the first cryptographic function 5. Thus the ciphertext user data 10" is retrieved from the storage medium 17 and sent on the first path 21 to the second cryptography engine 7 where a second cryptographic function 9 is applied 112 to the ciphertext user data 10" to generate plaintext user data 10'. The plaintext user data 10' is then passed along the first path 21 to the write channel 33 of the bus 31 and written 113 to the host device 15. In some examples, this includes writing 113 the plaintext user data 10' to the host memory 13.

Reading 120 device management data 12 from the host memory includes reading 121 device management data 12 from the host memory 13 of the host device 15. In this example, the device management data 12 is ciphertext device management data 12 that is securely stored in the host memory 13, where the ciphertext device management data 12 was previously generated with application of the second cryptographic function 9. Thus the ciphertext device management data 12 is retrieved from the host memory 13 and sent 121 on the fourth path 27 through the read channel 35 of the bus 31 and to the first cryptography engine 3. The first cryptography engine 3 applies 122 a first cryptographic function 5 to the ciphertext device management data to generate plaintext device management data. The plaintext device management data 12 is then received 123 at the processor 11. The processor 11 can then use the plaintext device management data 12 for control and management functions for the data storage device 1.

Second Mode 102—Writing Device Management Data and Reading User Data

Figure 4:
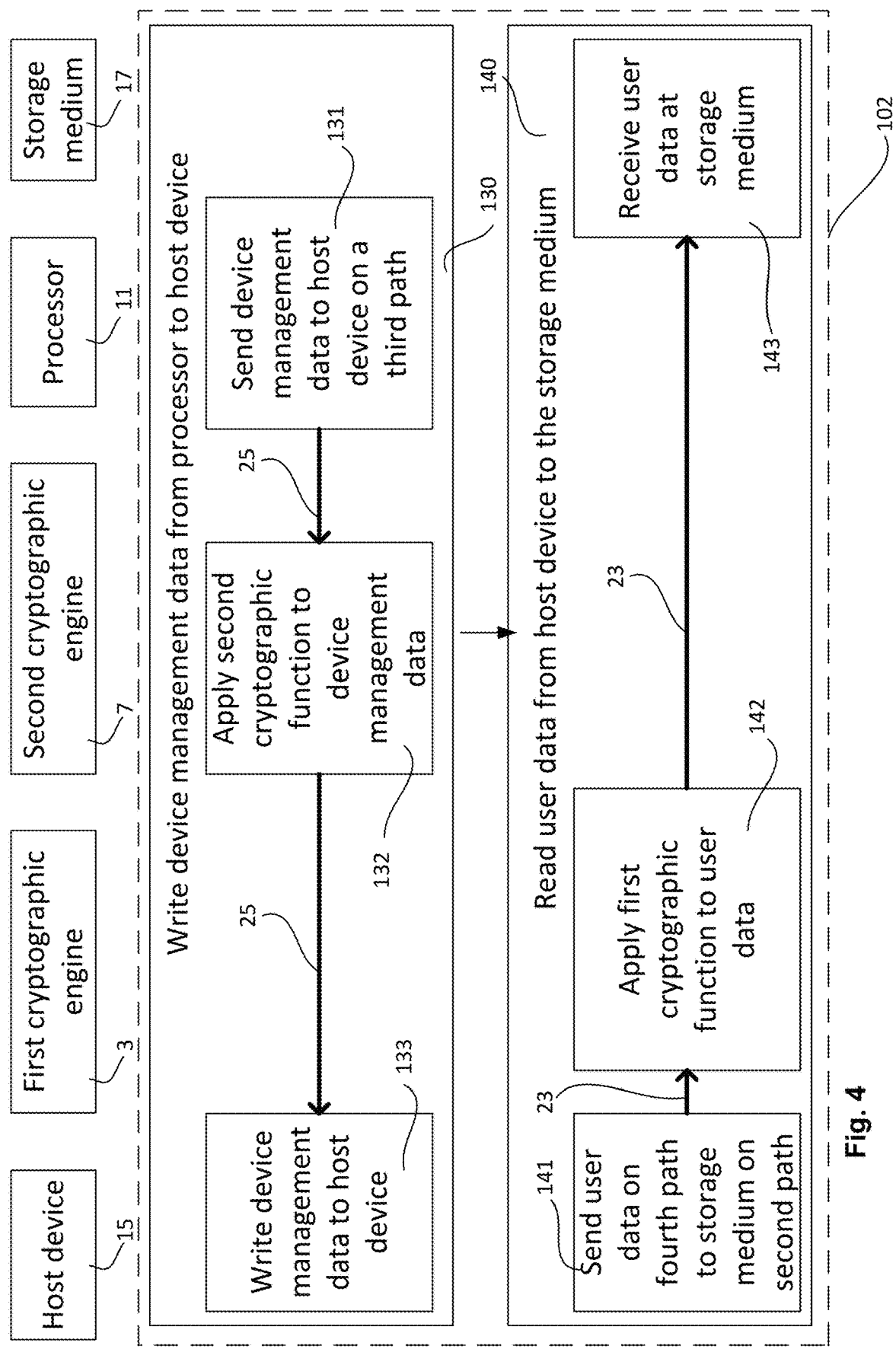
FIG. 4 is an example method of encrypting and decrypting data for the data storage device of FIG. 1 in a second mode to simultaneously write device management data to the host memory and read user data from the host device.

An example of the second mode 102 is illustrated in FIG. 4. In the second mode 102, the data storage device 1 is configured to simultaneously operate the second path 23 (using the first cryptography engine 3) and the third path 25 (using the second cryptography engine 7). This enables simultaneous reading 140 of user data 10 from the host device 15 to the storage device 17 and writing 130 of device management data 12 from the processor 11 to the host memory 13.

Writing 130 device management data 12 to the host memory 13 includes sending 131 device management data 12 to the host device 15 on a third path 25. In this example, the device management data 12 is initially plaintext device management data 12 from the processor 11. This plaintext device management data 12 is sent, on the third path 25, to the second cryptography engine 7 where a second cryptographic function 9 is applied 132 to the plaintext device management data 12 to generate ciphertext device management data 12. The ciphertext device management data 12 is then passed along the third path 25 to the write channel 33 of the bus 31 and written 133 to the host device 15. In some examples, this includes writing 133 the ciphertext device management data 12 to the host memory 13. In some examples the ciphertext device management data 12 is stored in a host memory buffer.

Reading 140 user data 10 from the host device 15 may include reading from the host memory 13. In this example, the user data 10 is plaintext user data 10' that needs to be sent to and securely stored in the storage medium 17. This includes retrieving the plaintext user data 10' from the host memory 13 sending 141 the user data on a second path 23 through the read channel 35 of the bus 31 and to the first cryptography engine 3. The first cryptography engine applies 142 the first cryptographic function 5 to the plaintext user data to generate ciphertext user data 10". The ciphertext user data 10" is then sent, via the second path 23, to be received 143 at the storage medium 17 where the ciphertext user data 10" is securely stored.

Third Mode 103—Read and Write User Data

Figure 5:
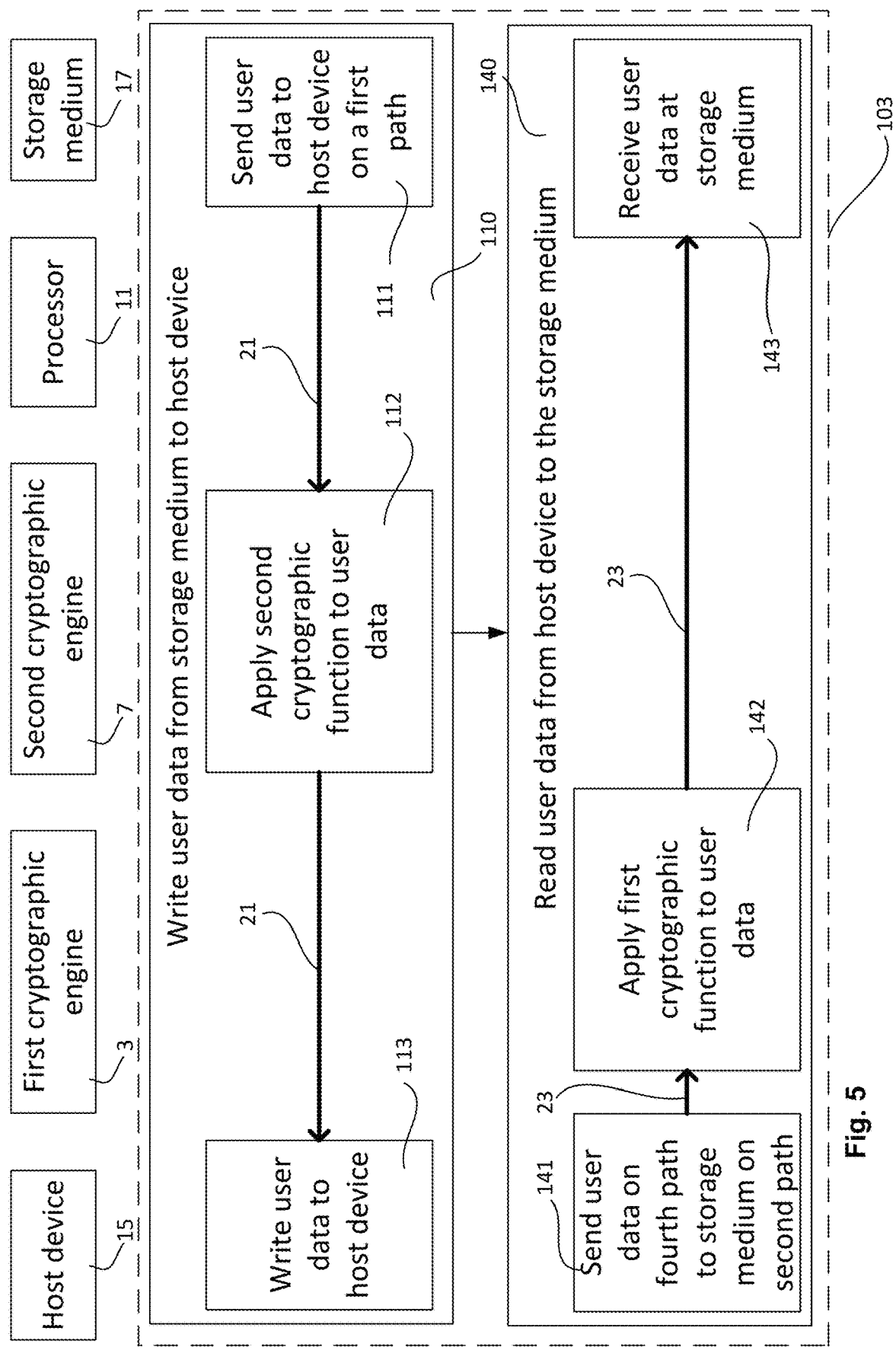
FIG. 5 is an example method of encrypting and decrypting data for the data storage device of FIG. 1 in a third mode to simultaneously write user data to the host device and read user data from the host device.

An example of the third mode 103 is illustrated in FIG. 5. In the third mode 103, the data storage device is configured to simultaneously operate in the first path 21 (using the second cryptography engine 7) and the second path 23 (using the first cryptography engine 3). This enables simultaneous reading 140 and writing 110 of user data 10 between the host device 15 and the storage device 17.

The steps of reading 140 of user data 10 is the same, or similar, to the steps of reading 140 user data 10 from the host device 15 as described above in the second mode 102 and illustrated in FIG. 4.

The steps of writing 110 user data 10 is the same, or similar, to the steps of writing 110 user data to the host device 15 as described above in the first mode 101 and illustrated in FIG. 3.

Fourth Mode 104—Read and Write Device Management Data

Figure 6:
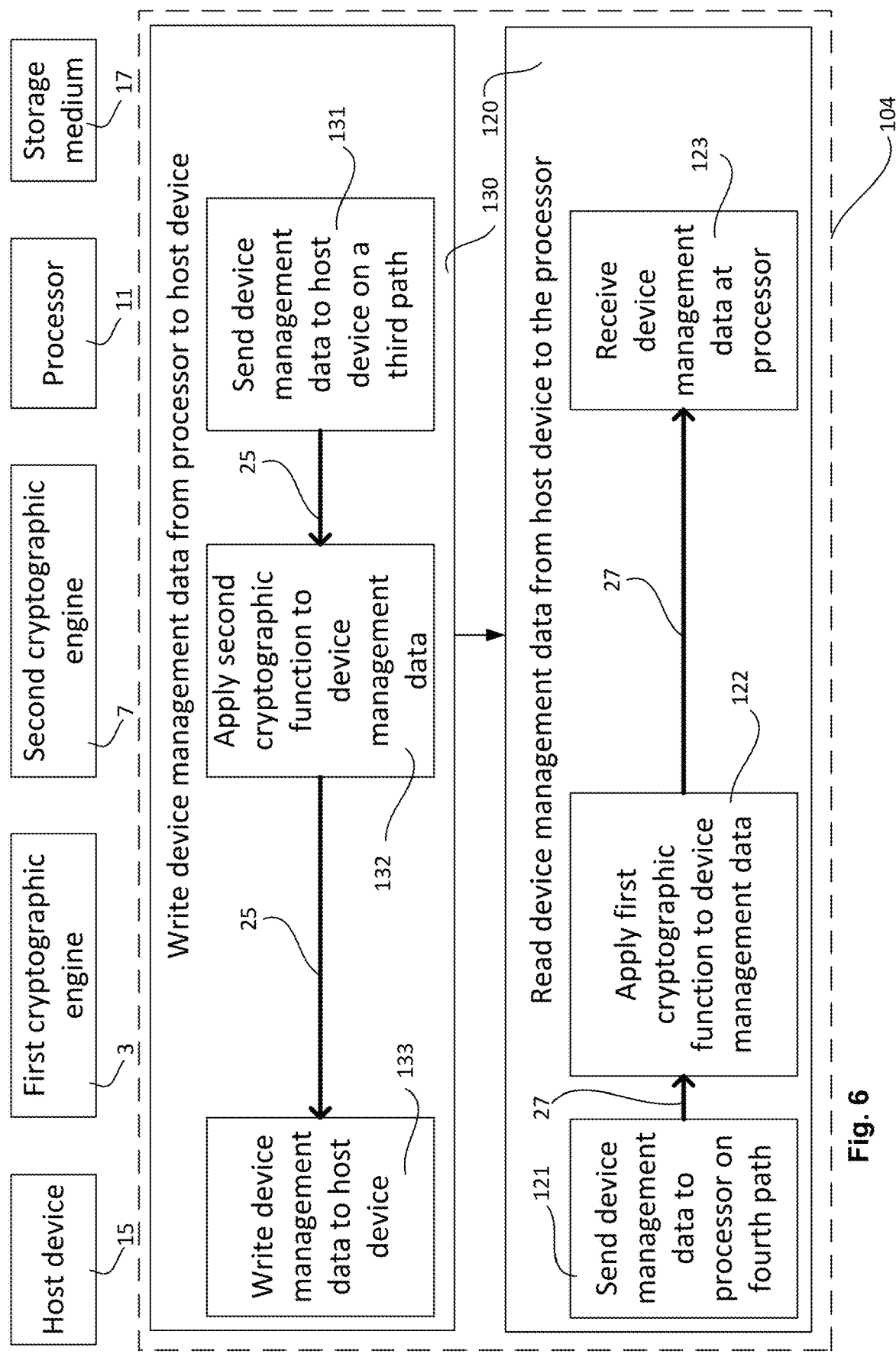
FIG. 6 is an example method of encrypting and decrypting data for the data storage device of FIG. 1 in a fourth mode to simultaneously write device management data to the host device and read device management data from the host device.

An example of the fourth mode 104 is illustrated in FIG. 6. In the fourth mode 104, the data storage device is configured to simultaneously operate in the third path 25 (using the second cryptography engine 7) and the fourth path 27 (using the first cryptography engine 3). This enables simultaneous reading 120 and writing 130 of device management data 12 between the host memory 13 and the processor 11.

The steps of reading 120 of device management data 12 is the same, or similar, to the steps of reading 120 device management data 12 from the host device 15 as described above in the first mode 101 and illustrated in FIG. 3.

The steps of writing 130 device management data 12 is the same, or similar, to the steps of writing 130 device management data 12 to the host device 15 as described above in the second mode 102 and illustrated in FIG. 4.

Second Example of a Data Storage Device 1

Figure 7:
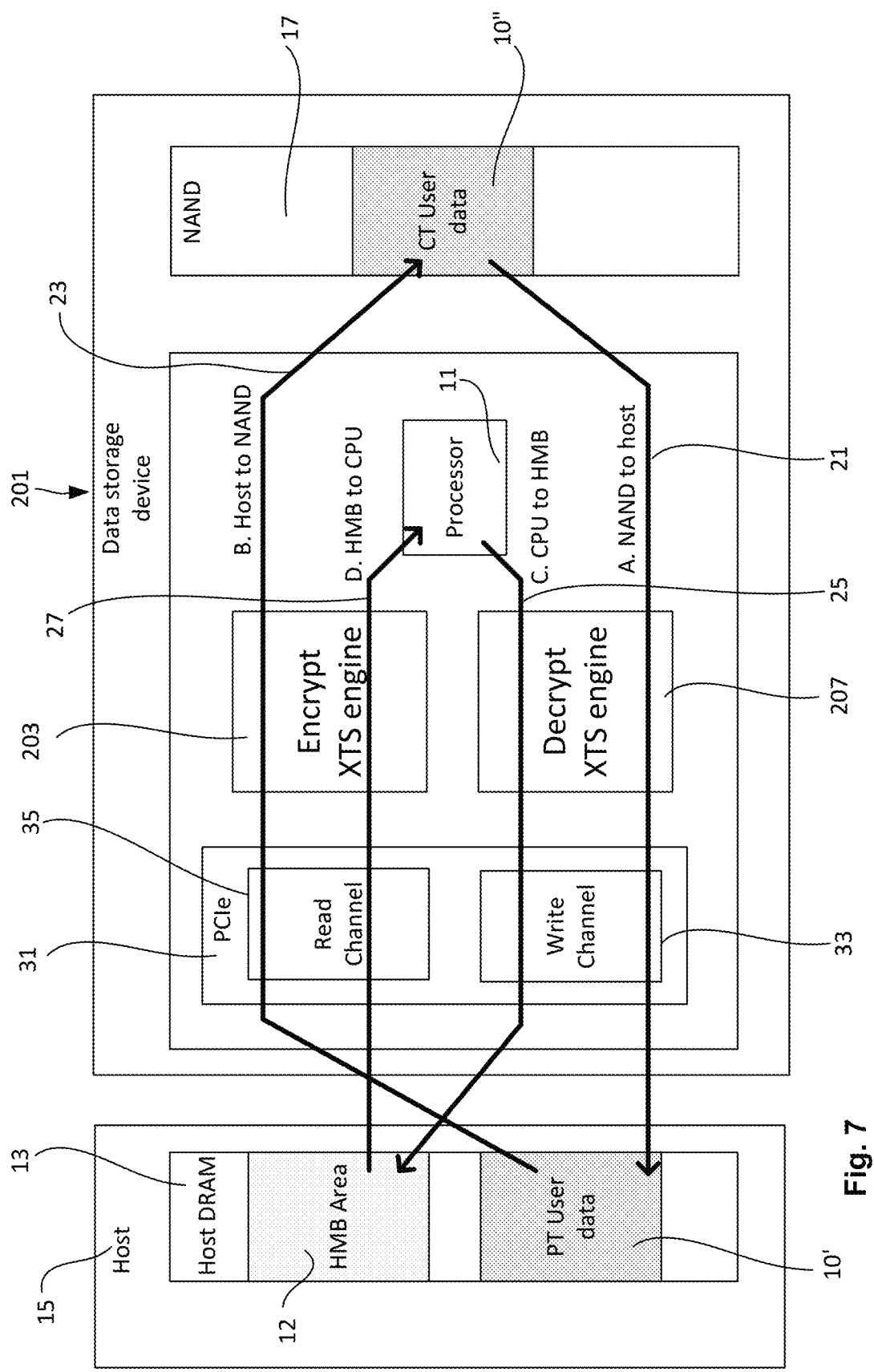
FIG. 7 is a schematic diagram of a data storage device according to a second example connected to a host device.

A second example of a data storage device 201 is illustrated in FIG. 7. The configuration of the second example is similar to the first example illustrated in FIG. 1 with the exception that the first cryptography engine 203 is configured to perform a first cryptographic function that is an encryption function. The second cryptography engine 207 is configured to perform a second cryptographic function that is a decryption function, Similar to the first example, the encryption function and second encryption function are inverse and symmetric.

This results in plaintext user data 10' that is encrypted to ciphertext user data 10" for storage in the storage medium 17 by applying an encryption function by the first cryptography engine 203. The reverse is achieved by applying, to the ciphertext user data 10" retrieved from the storage medium 17, a decryption function by the second cryptography engine 207 to produce plaintext user data 10'. The plain text device management data 12 from the processor passes the second cryptography engine 207 to apply a decryption function to produce ciphertext device management data 12 for storage at the host memory 13. To read the device management data 12, the ciphertext device management data passes through the first cryptography engine 203 to apply an encryption function to produce plaintext device management data 12 for the processor.

The second example of the storage device 1 can similarly operate parallel paths as the first example. The differences are that the first path 21 and third path 25 of the second example selectively pass through the second encryption engine 27 that is a decryption engine. In addition, the second path 23 and fourth path 27 of the second example selectively pass through the first encryption engine 203 that is an encryption engine. The second example can operate in the first, second, third, and fourth modes similar to the first example.

Third Example of a Data Storage Device with Reverse Encryption

Figure 9:
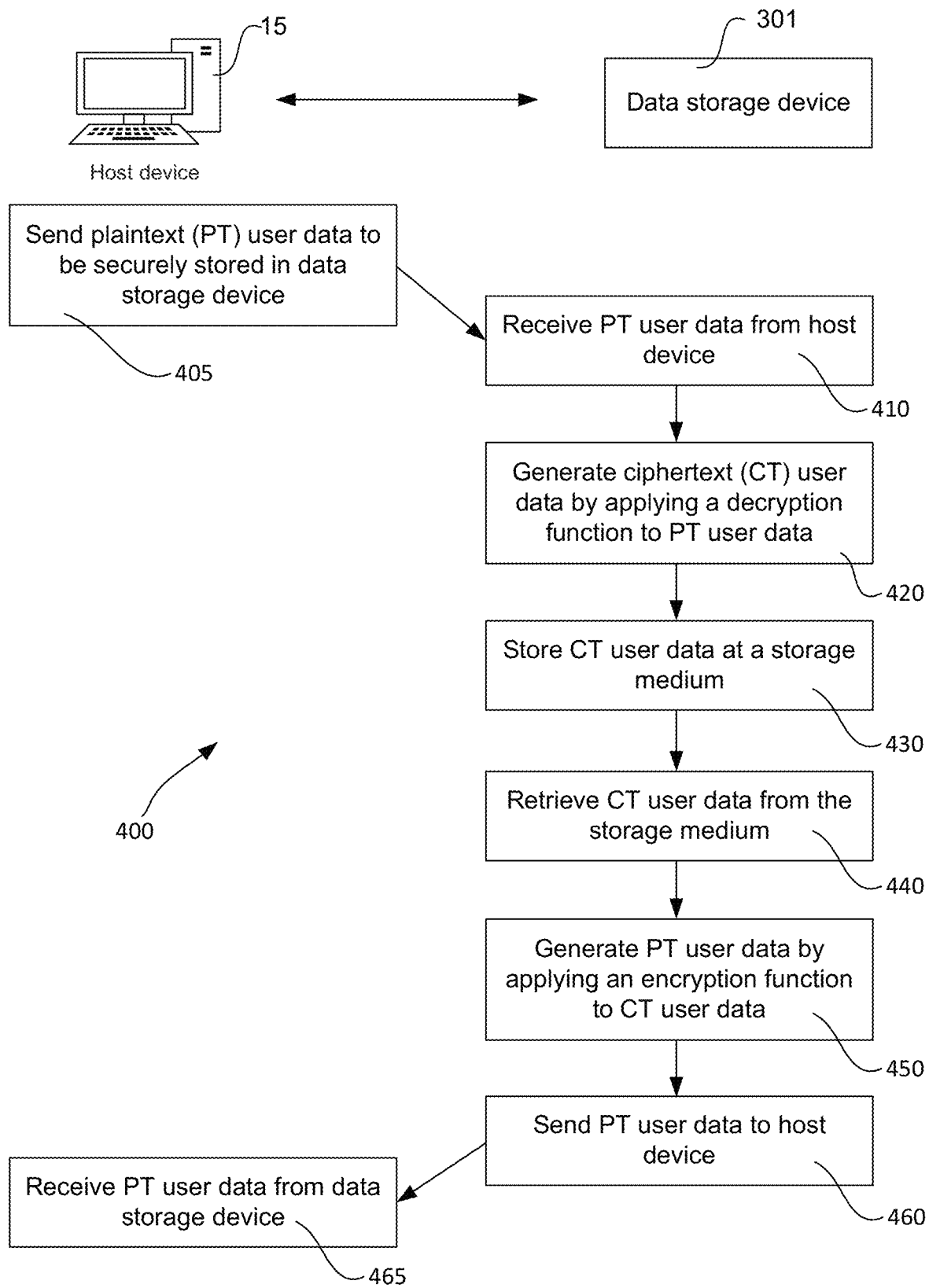
FIG. 9 is an example method of securely storing and retrieving data for the data storage device of FIG. 8.

A third example of a data storage device 301 with reverse encryption is illustrated in FIG. 8 and a corresponding method 400 illustrated in FIG. 9. The data storage device 301 includes a storage medium 17 to store ciphertext user data 10", a first cryptography engine 303 to perform a decryption function, and a second cryptography engine 307 to perform an encryption function. The data storage device 301 also includes a bus 31 and corresponding read channel 35 and write channel 33 similar to the other examples noted above.

The data storage device 301 includes a first path 321 to pass ciphertext user data 10" from the storage medium 17 to the second cryptography engine 307, whereby an encryption function is applied to the ciphertext user data 10", to generate plaintext user data 10'. This plaintext user data 10' is passed through the write channel 33 to the host memory 13 of the host device 15. A second path 323 passes plaintext user data 10' from the host memory 13 through the read channel 35 to the first cryptography engine 3. A decryption function is applied to the plaintext user data 10' to generate ciphertext user data 10" that is passed to the storage medium 17 for secure storage.

The encryption and decryption functions may be performed by XTS cryptography engines or other suitable engines as described above Method of Reverse Encryption The method 400 of secure storage using the data storage device 301 will now be described. The host device 15 sends 405 plaintext user data 10' to the data storage device 301. The data storage device 301 receives 410 the plaintext user data 10' through the read channel 35 that is passed to the first cryptography engine 303. The first cryptography engine 303 applies a decryption function to the plaintext user data 10' to generate 420 ciphertext user data 10". This is a reverse encryption in that a decryption algorithm is used to generate ciphertext. The ciphertext user data 10" is then securely stored 430 at the storage medium 17.

When user data is required at the host device, the method 400 includes retrieving 440 ciphertext user data 10" from the storage medium 17 that is then passed to the second cryptography engine 307. The second cryptography engine 307 applies an encryption function to the ciphertext user data 10" to generate 450 plaintext user data 10. The plaintext user data is then sent 460 to the host device 15. This can include sending, via the write channel 33, where it is received 465 at the host memory 13 of the host device 15.

Advantages Over Alternative Systems

The first and second examples of FIGS. 1 and 7 are advantageous as they may be configured to enable simultaneous transfer of user data 10 and device management data 12 between the data storage device 1, 201 and the host device 15 while using a single encryption engine and a single decryption engine. This advantage can be illustrated in comparison with alternative approaches such as FIG. 10 noted below.

FIG. 10 illustrates an alternative approach to securely storing user data and device management data with two cryptography engines 503, 507 in a data storage device 501. In this example a first cryptography engine 503 is configured to perform decryption functions. A second cryptography engine 507 is configured to perform encryption functions. Second paths 523 and third path 525 are selectively configured to enable encryption of plaintext user data 10' or plaintext device management data 12 by the second cryptography engine 507. First path 521 and fourth path 527 are configured to enable decryption of ciphertext user data 10" or ciphertext device management data 12 by the first cryptography engine 203.

The storage device 501 enables secure storage of ciphertext user data 10" at the data storage device 517 and secured storage of ciphertext device management data 12 at the host memo 513 of the host device 15. This storage device 501 may also enable simultaneous reading and writing of user data 10 between the host device 15 and the data storage device 517 via the first paths 521 with write channel 33 and the second path 523 with the read channel 35. The storage device 501 may also enable simultaneous reading and writing of device management data 12 via the third path 525 with write channel 33 and fourth path 527 with read channel 35.

However, the above paths do not allow a mix of simultaneously transferring user data 10 and device management data 12 since the paths also share read and write channels. For example, when the storage device 501 is reading user data 10' from the host device 15 via second path 523, the read channel 35 and second cryptography engine 507 is used. During this time, the first cryptography engine 503 is available. However, in this configuration, it is not possible to use the first cryptography engine 503 to decrypt device management data 12 from the host memory 513 via the fourth path 527. This is due to unavailability of the read channel 35 as the second path 523 is using that resource at that time. Furthermore, it is not possible to simultaneously write device management data 12 to the host memory 513 via the third path 525 since there is only a single second cryptography engine 507 (that is in used to read user data 10' from the host device 15).

Similarly, when the storage device 501 is writing user data to the host device 15 via the first path 521, the write channel 33 and first cryptography engine 503 is used. At this time, it is not possible to use the second cryptography engine 507 to encrypt device management data 12 and send to the host memory 513 via the third path 525 as the write channel 33 is already used by the first path 521.

Thus the first and second examples of FIGS. 1 and 7 advantageously enable simultaneous transfer of user data 10 and device management data 12. This includes configuring: writing of user data to the host device whilst simultaneously reading device managements data from the host memory (via first and fourth paths 21, 27); and reading of user data from the host device whilst simultaneously writing device management data to the host memory 13 (via second and third paths 23, 25).

The first and second examples 1, 201 are also advantageous in that simultaneous transfer can be achieved with two cryptography engines. In contrast, FIG. 11 illustrates a further alternative approach using four cryptography engines 603, 604, 607, 608 for each of the paths 621, 623, 625, 627. The first path 621 has a corresponding cryptography engine 603 to apply a decryption cryptographic function to ciphertext user data 10" from the storage medium 617. The resultant plaintext user data 10' is then passed through the write channel 33 and written to the host device 13. The second path 623 enables receiving plaintext user data 10' from the host device 15, via the read channel 35, and then applying an encryption cryptographic function to the plaintext user data by a corresponding cryptography engine 607. The resultant ciphertext user data 10" is then written to the storage medium 617. The third path 625 enables receiving plaintext device management data from the processor 11 whereby a corresponding cryptography engine 608 applies an encryption cryptographic function. The resultant ciphertext device management data is then written to the host memory 13 via the write channel 33. The fourth path 627 enables reading ciphertext device management data 12 from the host memory 13 via the read channel 35. The ciphertext device management data 12 is then decrypted with a decryption cryptographic function of a corresponding cryptography engine 608 and the resultant plaintext device management data 12 is received at the processor 11.

The alternative approach illustrated in FIG. 11 involves four cryptography engines that may, in some circumstance, be configured to enable simultaneous transfer of user data and device management data. However, this involves double the cryptography engine resources compared to the other examples described above. A consequence of having additional cryptography engines include increased use of silicon area in the data storage device, higher power consumption of the data storage device. This can also results in additional production time, resources required for production, and production cost. Thus examples of the present disclosure, including the first and second examples illustrated in FIGS. 1 and 7 have technical advantages over other configurations such as those illustrated in FIGS. 10 and 11.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
    a first cryptography engine selected to apply a first cryptographic function to data;
    a second cryptography engine selected, responsive to selection of the first cryptography engine, to apply a second cryptographic function to data, wherein the first cryptographic function is inverse, and symmetric, to the second cryptographic function;
    a duplex bus configured to support parallel operation of:
        a read channel configured to: receive data from a host device; and select between the first cryptography engine and the second cryptography engine; and
        a write channel configured to: write data to the host device; and select between the first cryptography engine and the second cryptography engine;

a processor configured to control the data storage device;
a storage medium;
a first path configured to pass user data from the storage medium to the host device, wherein: the first path passes through the second cryptography engine to apply the second cryptographic function to the user data sent to the host device; and the write channel is selectively operable to form part of the first path for the user data;
a second path configured to pass user data from the host device to the storage medium, wherein: the second path passes through the first cryptography engine to apply the first cryptographic function to the user data sent to the storage medium; and the read channel is selectively operable to form part of the second path for the user data;
a third path configured to pass device management data from the processor to a host memory of the host device, wherein the third path: passes through the second cryptography engine to apply the second cryptographic function to the device management data sent to the host memory; uses direct memory access to write the device management data to the host memory; and the write channel is selectively operable to form part of the third path for the device management data responsive to the first path not being operated; and
a fourth path configured to pass device management data from the host memory to the processor, wherein the fourth path: passes through the first cryptography engine to apply the first cryptographic function to the device management data received at the processor; uses direct memory access to read the device management data from the host memory; and the read channel is selectively operable to form part of the fourth path for the device management data responsive to the second path not being operated.

2. The data storage device according to claim 1, wherein:
the processor is further configured to selectively operate up to two paths simultaneously selected from:
the first path;
the second path;
the third path; and
the fourth path;
a first simultaneous selectively operated path uses the first cryptography engine; and
a second simultaneous selectively operated path uses the second cryptography engine.

3. The data storage device according to claim 1, wherein the data storage device is selectively configurable by the processor to operate in:
a first mode to simultaneously pass user data in the first path and pass device management data in the fourth path; or
a second mode to simultaneously pass device management data in the third path and pass user data in the second path.

4. The data storage device according to claim 1, wherein the data storage device is selectively configurable by the processor to operate in:
a third mode to simultaneously pass user data in the first path and user data in the second path; or
a fourth mode to simultaneously pass device management data in the third path and device management data in the fourth path.

5. The data storage device according to claim 1, wherein the first cryptographic function is a decryption function and the second cryptographic function is an encryption function.

6. The data storage device according to claim 1, wherein the first cryptographic function is an encryption function and the second cryptographic function is a decryption function.

7. The data storage device according to claim 1, wherein the first cryptography engine and the second cryptography engine are XOR-encrypt-XOR-based tweaked codebook mode with ciphertext stealing (XTS) cryptography engines.

8. The data storage device according to claim 1, wherein the storage medium is solid-state storage.

9. The data storage device according to claim 2, wherein the duplex bus is a Peripheral Component Interconnect Express (PCIe) standard bus.

10. A method for encrypting and decrypting data for a data storage device having
a storage medium,
a first cryptography engine,
a second cryptography engine,
a read channel, a write channel, and
a processor to control the data storage device, wherein:
the method comprises:
selecting the first cryptography engine to apply a first cryptographic function to data; and
selecting, responsive to selection of the first cryptography engine, the second cryptography engine to apply a second cryptographic function to data;
the first cryptographic function is inverse, and symmetric, to the second cryptographic function; and
in a first mode, the method further comprises:
selectively operating, for user data, the write channel with the second cryptography engine;
writing the user data from the storage medium to a host device on a first path, wherein
writing on the first path includes applying the second cryptographic function to the user data by the second cryptography engine;
selectively operating, for device management data, the read channel with the first cryptography engine; and
reading the device management data from a host memory of the host device to the processor on a fourth path, wherein:
reading on the fourth path includes applying the first cryptographic function to the device management data by the first cryptography engine;
reading on the fourth path uses direct memory access to read the device management data from the host memory;
the first cryptographic function is inverse, and symmetric, to the second cryptographic function; and
writing the user data on the first path and reading the device management data on the fourth path are executed simultaneously using the read channel and the write channel.

11. The method according to claim 10, wherein, in a second mode, the method further comprises:
selectively operating, for the device management data, the write channel with the second cryptography engine;
writing the device management data from the processor to the host memory on a third path, wherein writing on the third path includes: applying the second cryptographic function to the device management data by the second cryptography engine; and using direct memory access to write the device management data to the host memory;
selectively operating, for the user data, the read channel with the first cryptography engine; and
reading the user data from the host device to the storage medium on a second path, wherein: reading on the second path includes applying the first cryptographic function to the user data by the first cryptography engine;

writing the device management data on the third path and reading the user data on the second path are executed simultaneously using the read channel and the write channel; and only one of the first mode and the second mode operates a time.

12. The method according to claim 11, wherein:

in the first mode, the processor selectively configures the first path and the fourth path as separate paths to enable simultaneous writing of user data and reading of device management data; and in the second mode, the processor selectively configures the second path and the third path as separate paths to enable simultaneous writing of device management data and reading of user data.

13. The method according to claim 11, wherein:

writing the user data in the first mode and writing the device management data in the second mode include communicating to the host device via the write channel of a duplex bus between the host device and the data storage device; and reading the device management data in the first mode and reading the user data in the second mode include communicating to the host device via the read channel of the duplex bus.

14. The method according to claim 13, wherein the duplex bus is a Peripheral Component Interconnect Express (PCIe) standard bus.

15. The method according to claim 10, wherein, in a third mode, the method further comprises:

selectively operating, for the user data, the write channel with the second cryptography engine;

writing the user data from the storage medium to the host device on a first path, wherein writing on the first path includes applying the second cryptographic function to the user data by the second cryptography engine;

selectively operating, for the user data, the read channel with the first cryptography engine; and reading the user data from the host device to the storage medium on a second path, wherein: reading on the second path includes applying the first cryptographic function to the user data by the first cryptography engine;

writing the user data on the first path and reading the user data on the second path are executed simultaneously using the read channel and the write channel; and only one of the first mode and the third mode operates at a time.

16. The method according to claim 10, wherein, in a fourth mode, the method further comprises:

selectively operating, for the device management data, the write channel with the second cryptography engine;

writing the device management data from the processor to the host memory on a third path, wherein writing on the third path includes: applying the second cryptographic function to the device management data by the second cryptography engine; and using direct memory access to write the device management data to the host memory;

selectively operating, for the device management data, the read channel with the first cryptography engine; and reading the device management data from the host memory of the host device to the processor on the fourth path, wherein reading on the fourth path includes: applying the first cryptographic function to the device management data by the first cryptography engine; using direct memory access to read encrypted device management data from the host memory;

writing the device management data on the third path and reading the device management data on the fourth path are executed simultaneously using the read channel and the write channel; and only one mode of the first mode and the fourth mode operates at a time.

17. The method according to claim 10, wherein the first cryptographic function is a decryption function and the second cryptographic function is an encryption function.

18. The method according to claim 10, wherein the first cryptographic function is an encryption function and the second cryptographic function is a decryption function.

19. The method according to claim 10, wherein the first cryptography engine and the second cryptography engine are XOR-encrypt-XOR-based tweaked codebook mode with ciphertext stealing (XTS) cryptography engines.

20. A data storage device comprising:

a first cryptography engine selected to apply a first cryptographic function to data;

a second cryptography engine selected, responsive to selection of the first cryptography engine, to apply a second cryptographic function to data, wherein the first cryptographic function is inverse, and symmetric, to the second cryptographic function;

a duplex bus configured to support parallel operation of:
a read channel configured to: receive data from a host device; and select between the first cryptography engine and the second cryptography engine; and
a write channel configured to: write data to the host device; and select between the first cryptography engine and the second cryptography engine;

a processor; a storage medium;

a first means, using the write channel, for passing user data from the storage medium to the host device, wherein the first means is configured to pass the user data through the second cryptography engine to apply the second cryptographic function to the user data sent to the host device;

a second means, using the read channel, for passing user data from the host device to the storage medium, wherein the second means is configured to pass the user data through the first cryptography engine to apply the first cryptographic function to the user data sent to the storage medium;

a third means, using the write channel and responsive to the first means not being operated, for passing device management data from the processor to a host memory of the host device, wherein the third means is configured to: pass the device management data through the second cryptography engine to apply the second cryptographic function to the device management data sent to the host memory; and use direct memory access to write encrypted device management data to the host memory; and a fourth means, using the read channel and responsive to the second means not being operated, for passing device management data from the host memory to the processor, wherein the fourth means is configured to: pass the device management data through the first cryptography engine to apply the first cryptographic function to the device management data received at the processor; and use direct memory access to read encrypted device management data from the host memory.

\* \* \* \* \*